United States Patent [19]

Sevelinge et al.

[11] Patent Number: 5,101,694
[45] Date of Patent: Apr. 7, 1992

[54] APPARATUS FOR SCREWING IN AND OUT STUDS OR BOLTS OF LARGE DIMENSIONS

[75] Inventors: Gerard Sevelinge, Montceau les Mines; Jean C. Bourbonné, Le Breuil, both of France

[73] Assignee: Framatome, Courbevoie, France

[21] Appl. No.: 200,495

[22] Filed: May 26, 1988

[30] Foreign Application Priority Data

May 27, 1987 [FR] France ................. 87 07511

[51] Int. Cl.⁵ .......................................... B25B 29/00
[52] U.S. Cl. ................................ 81/57.4; 81/57.24; 81/57.38
[58] Field of Search ............... 81/57.24, 57.38, 57.4; 173/43, 12, 42

[56] References Cited

U.S. PATENT DOCUMENTS

| | | | |
|---|---|---|---|
| 4,047,456 | 9/1977 | Scholz | 81/57.38 |
| 4,295,393 | 10/1981 | Adcock | 81/57.38 X |
| 4,380,181 | 4/1983 | Bunyan | 81/57.38 |
| 4,498,545 | 2/1985 | Grassi et al. | 81/57.24 X |

Primary Examiner—James G. Smith
Attorney, Agent, or Firm—Pollock, Vande Sande & Priddy

[57] ABSTRACT

The apparatus for screwing in and out studs (3) of large dimensions, particularly for fastening a cover (2) of a vessel (2) provided with threaded holes, comprises a system (13) which serves to balance the weight of the stud and is force pilot operated by an oleohydraulic means by electrohydraulic feedback control based on accurate measurement of the hydraulic pressure detected at the oleohydraulic means or the balancing load to be exerted by said oleohydraulic means in order to limit the contact pressure between the stud and the threaded hole, and which axially drives, over an adequate path, a mechanism rotationally driving the stud and a means for gripping said stud.

7 Claims, 4 Drawing Sheets

APPARATUS FOR SCREWING IN AND OUT STUDS OR BOLTS OF LARGE DIMENSIONS

FIELD OF THE INVENTION

The present invention relates to an apparatus for screwing in and out studs or bolts of large dimensions, for example for fastening the cover of a vessel.

BACKGROUND OF THE INVENTION

It is known that, for example in nuclear reactors, the cover is detachably fastened on the vessel in order to enable the reactor to be periodically recharged with fuel and to take the opportunity to inspect the interior of the vessel and the components situated in it.

For this purpose the cover is fastened on the reactor vessel by studs, which are screwed into the flange of the vessel and which pass through plain holes provided in the flange of the cover. A fairly large number of these studs, disposed relatively close to one another, are generally used, so that the removal and refitting of the cover require the unscrewing and screwing in of all these studs, in addition to their tensioning.

These operations of screwing the studs in and out are uncertain and delicate. Each stud in fact weighs several hundred kilograms, so that during the screwing of the stud into or out of the threaded hole it is necessary to overcome frictional resistance which occurs in the screw thread and which with the weight of the stud. Furthermore, the axes of the different components of the screwing apparatus do not always coincide with the axes of the threaded holes in the vessel, or with the axes of the studs, after a period of operation. Consequently, it frequently occurs that coaxiality of the stud cannot always be achieved automatically when it is introduced into the threaded hole in the vessel, and this operation, as well as the first few turns for the screwing-in of the stud, must be carried out manually. This has the consequence that the operators carrying out this work must remain for too long a time in a zone of excessively high radioactivity.

These alignment faults, which may also give rise to the jamming of the stud while it is being screwed into the receiving threaded hole in the vessel, subject the moving parts to stresses distributed irregularly around their axis of translation or of rotation, which, as the result of friction, may give rise to irregular premature wear, and also to the formation of "tinsel", i.e., long shavings of small section formed from the metal of the screw thread, which is softer than the stud, through excessive friction between the stud and the receiving screw thread.

SUMMARY OF THE INVENTION

The present invention therefore seeks to provide an apparatus for screwing studs of large dimensions in and out, in such a manner as to prevent the seizing of the stud in the receiving screw thread and correlatively reducing the time required for screwing the studs in and out.

To this end the apparatus for screwing studs in and out, comprising:
 a system searching for the optimum screwing-in position for the stud and for orienting the latter in accordance with an appropriate trajectory,
 a system balancing the weight of the stud,
 a mechanism rotationally driving the stud at regulable speed in both directions,
 a stud gripping means enabling an axial load to be applied to the stud, and
 a programmable automaton for pilot operation of the apparatus, provides that the weight balancing system is pilot operated by an oleohydraulic means by electrohydraulic feedback control based on accurate measurement of the hydraulic pressure detected at the oleohydraulic means or of the balancing load to be applied by said oleohydraulic means in order to limit the contact pressure of said stud in said threaded hole, and axially drives, over an adequate path, the assembly comprising the mechanism for the rotational driving of the stud and the stud gripping means.

The mechanism for rotational driving at regulable speed is driven by a variable speed eddy current motor allowing the rotational driving of the stud above a determined screwing torque threshold.

BRIEF DESCRIPTION OF THE DRAWINGS

In order to enable the invention to be fully understood, a description will now be given of one embodiment of the apparatus according to the invention, with reference to the accompanying drawings.

DESCRIPTION OF PREFERRED EMBODIMENT

Figure 1:
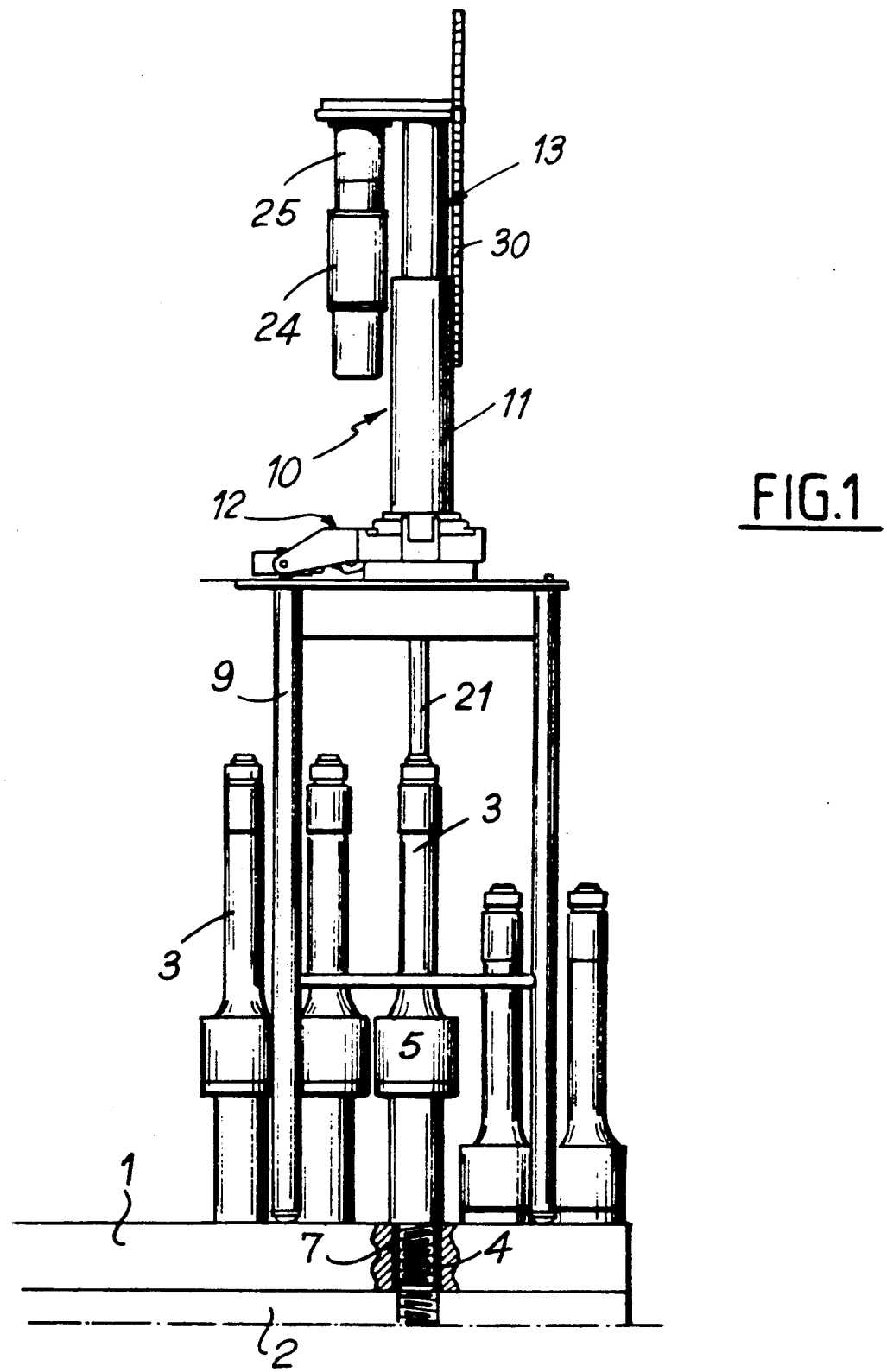
FIG. 1 is a schematic plan view showing the installation of the screwing and unscrewing apparatus according to the invention.
Figure 2:
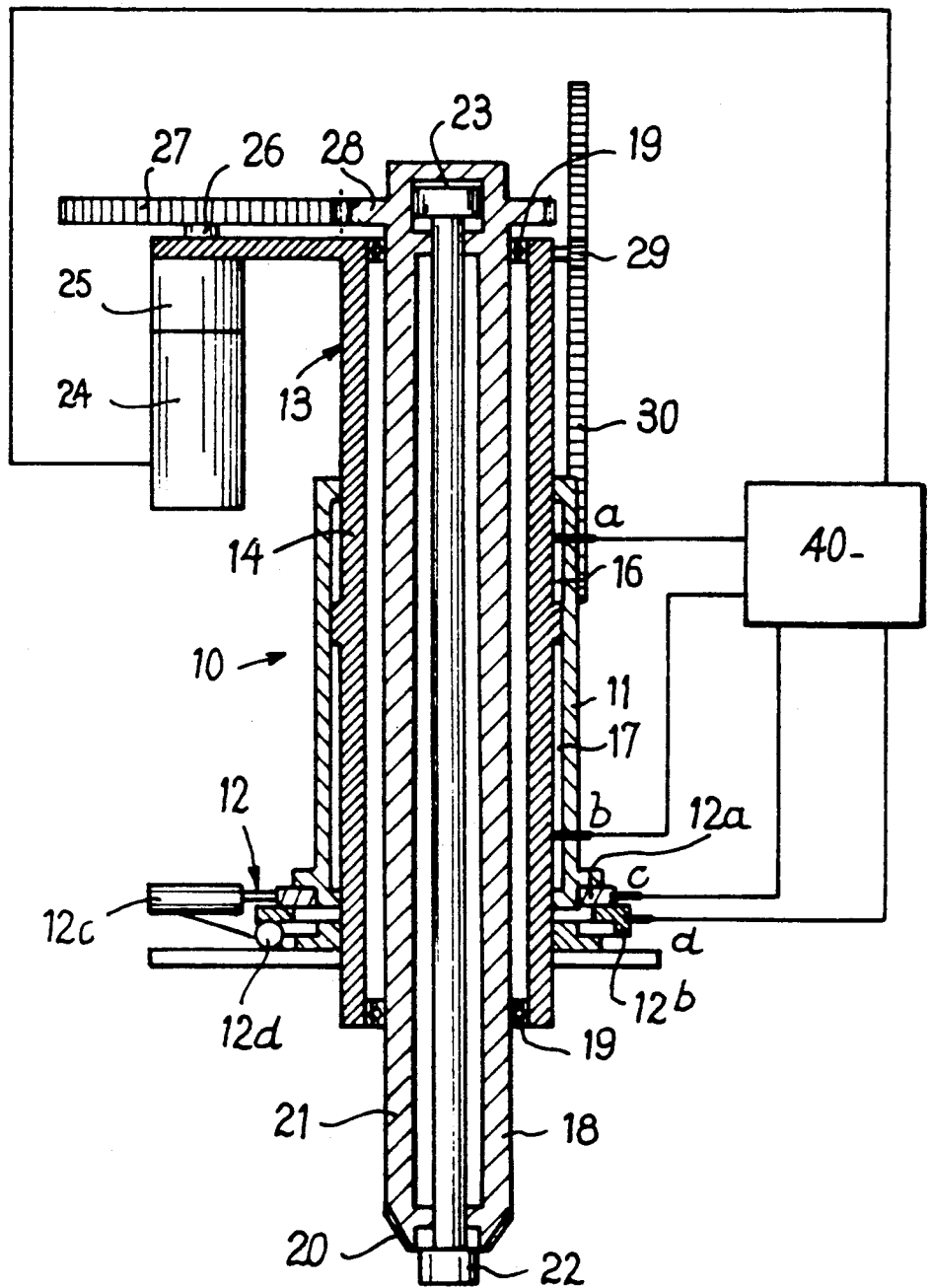
FIG. 2 is a cross-sectional view on a larger scale of the system for balancing the weight of the stud, incorporated in the screwing and unscrewing apparatus.

The screwing and unscrewing apparatus according to the invention, as illustrated in FIG. 1, is used for opening or closing a cover 1 of a vessel 2, for example in a nuclear reactor.

As is well known, the cover 1 and the vessel 2 have a shape of revolution around a vertical geometrical axis. The cover 1 is detachably fastened on the vessel 2 by means of a number of studs 3 having a vertical axis, which are distributed regularly over the periphery of the cover 1 and of the vessel 2.

Each stud passes through a plain hole 7 provided vertically in the peripheral edge of the cover 1 and is provided at the bottom with a screw thread 4 intended to be screwed into a tapped hole in the peripheral edge of the vessel, and in its middle portion is provided with a second screw thread, on which a vessel nut 5 is screwed. In addition, the stud 3 is provided at the top with circular grooves or threads of appropriate profile enabling it to be tensioned, and with an internal cavity (not shown) for the insertion of a means for gripping and rotation by the screwing and unscrewing apparatus.

The screwing and unscrewing apparatus, given the general reference 10, is supported by means of a frame 9 which rests and moves on the cover 1.

The screwing and unscrewing apparatus 10 is composed of a casing 11 connected at the bottom to a system 12 for searching for the optimum position for the screwing-in of the stud 3 and for the orientation of the stud on an appropriate trajectory.

This system 12 for searching for the optimum screwing-in position, described in U.S. Pat. No. 4,785,520 having a common assignee with the present application tables 12a and 12b movable at right angles to one another and operated by respective jacks 12c and 12d, whose operation is slaved to the measurement of the screwing torque and of the screwing conditions of the stud. These tables describe various types of trajectory, for example Archimedean spirals or flattened, rectangular or square spirals, and enable the stud to be screwed in by making a cumulative search for the optimum screwing position, in such a manner as to avoid the occurence of stresses on the moving parts.

This casing 11, which is for example of cylindrical shape, forms the body of a jack 13 balancing the weight of the stud 3.

The jack 13 is composed of a hollow jack rod 14 whose outside diameter is slightly smaller than the inside diameter of the casing 11 and which is provided on its periphery, inside the casing 11, with a thickened portion 15 forming a piston equipped with sealing means and forming two chambers 16 and 17 inside the casing 11.

The rod 14 of the jack 13 balancing the weight of the stud 3 has a sufficiently long stroke inside the casing 11 to cover the entire screwing-in travel of each stud, so that this jack can also be used for the axial inward or outward movements of each stud.

Inside the rod 14 of the jack 13 is disposed a hollow shaft 18 for the rotational driving of the stud 3. This hollow shaft 18 extends out of each end of the rod 14 and follows the vertical movements of the latter, but is free to turn said rod. The rotation of the shaft 18 is, for example, guided at each end of the rod 14 by bearings 19.

At its bottom end, the shaft 18 is provided with splines 20 adapted to engage in the cavity provided at the top of the stud for the rotational driving of the latter.

In addition, a stud support spindle 21 is incorporated in the shaft 18. This spindle 21 is provided at the bottom with a stud gripper device 22, for example of the ball locking type controlled by a small hydraulic jack 23 disposed in the shaft 18 effecting the rotational driving of the stud.

The system for the rotational driving of the shaft 18 is fixed to the top of the rod 14 of the jack 13 and is operated by a variable speed eddy current motor 24 driving a reduction gearbox 25, whose output shaft 26 drives a gear 27 meshing with a pinion 28 mounted at the top of the shaft 18.

The height of the rod 14 of the weight balancing jack 13 is measured by an encoder (not shown) detecting the displacement of a small pinion 29 which moves at the same time as the rod 14 on a rack 30.

Furthermore, the apparatus incorporates various measuring devices, particularly devices measuring pressure by means of sensors a and b disposed on the weight balancing jack 13, displacement transducers c and d of the potentiometer type in the system 12 for searching for the optimum screwing position for pilot operation of said jack, and means for continuous measurement of screwing parameters, such as torque measurement and measurement of the screwing or unscrewing speed.

The jack 13 thus forms an oleohydraulic means for weight balancing by electrohydraulic force feedback control based on accurate measurement of the load or difference in pressured detected by the sensors a and b in the chambers 16 and 17, for the purpose of limiting the contact pressure between the stud and the screw thread, and therefore the screwing torque.

The weight balancing jack 13 enables the stud 3 to move on a vertical axis and also serves to effect the partial or full balancing of the weight of the stud 3.

Figure 3:
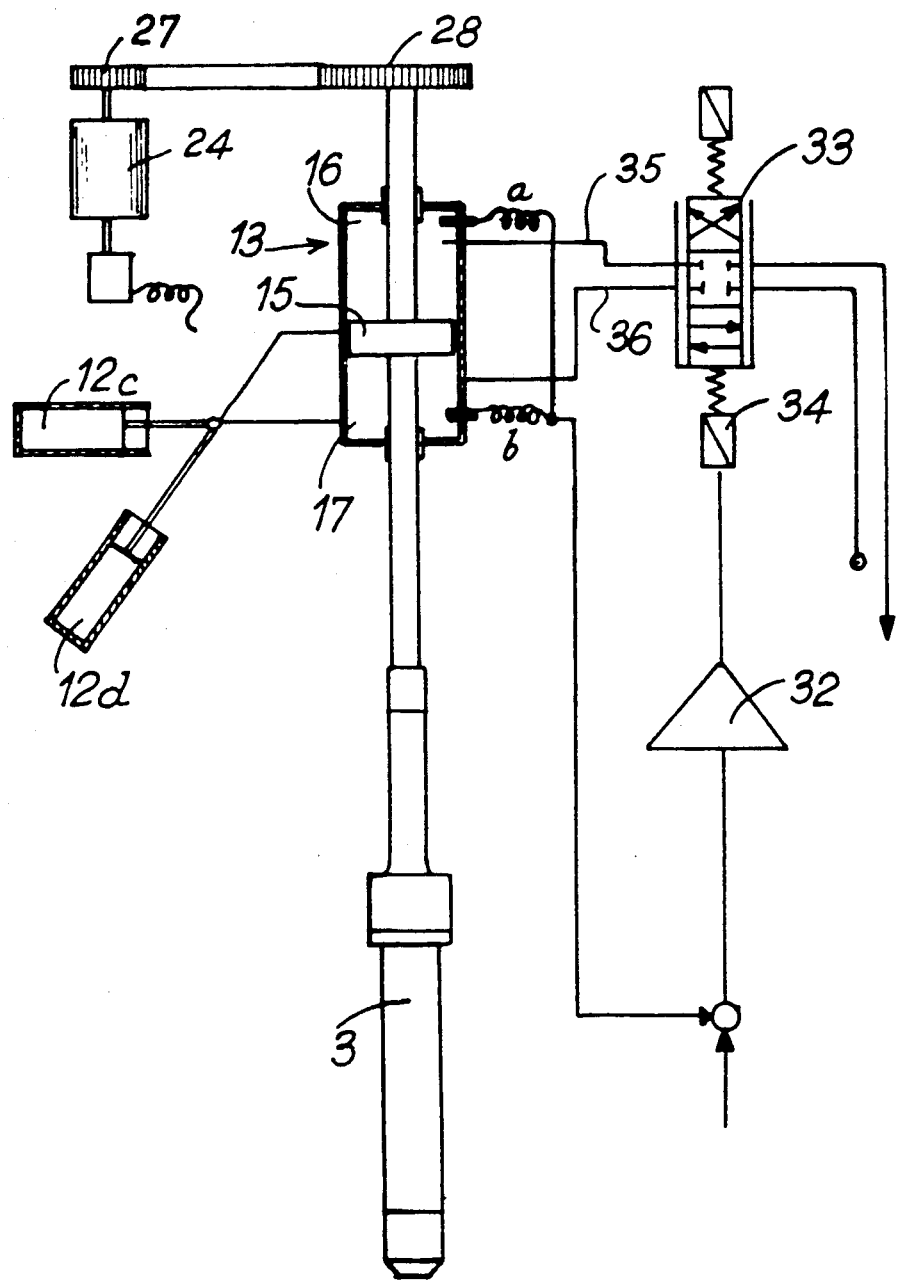
FIG. 3 is a schematic view of the feedback loop of the system for balancing the weight of the stud.

For this purpose, the jack 13 is inserted in an electrohydraulic force feedback loop, shown in FIG. 3.

In addition to the jack 13, this feedback loop comprises the pressure sensors a and b connected to an amplifier 32, which controls a solenoid valve 33 by means of a coil 34. This solenoid valve 33 feeds the chambers 16 and 17 of the jack 13 via respective conduits 35 and 36.

Figure 4:
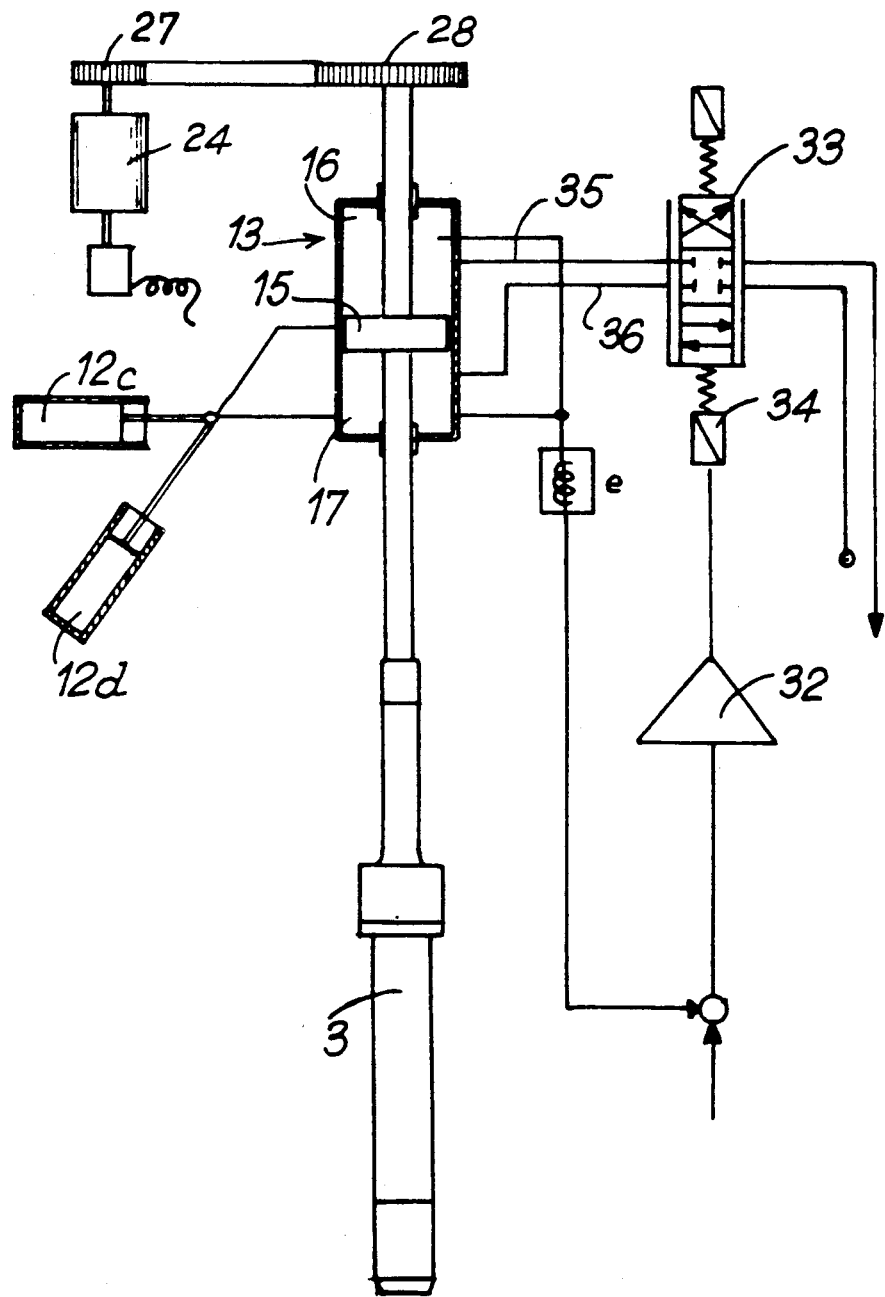
FIG. 4 is a schematic view of a variant of the feedback loop.

In the variant shown in FIG. 4, the pressure sensors a and b are replaced with a single differential pressure sensor e.

The entire apparatus is associated with a programmable automaton 40 or an appropriate electronic system or a computer serving principally:

- to pilot operate the electrohydraulic feedback control of the weight balancing jack 13,
- to interlink the different screwing phases, i.e., the lowering of the balancing jack, the locking of the stud, the clockwise or counterclockwise rotation, the search for the optimum screwing position, the bottom limit of travel, the raising of the balancing jack, or the different unscrewing phases,
- to select the different speeds of rotation of the stud in accordance with the screwing phase concerned,
- to compare the screwing torque with a displayed desired value of the torque threshold for a given speed of rotation, and
- to control the movement of the tables 12a and 12b in accordance with the type of trajectory selected, when the screwing torque reaches a certain percentage of the torque threshold which is not to be exceeded.

The operation of the apparatus thus described is as follows:

In the course of a preparatory phase, the screwing and unscrewing apparatus 10 is first placed in position above the stud 3 which is to be screwed in, the verticality of the apparatus is checked, the various electrical and hydraulic connections are made, and it is checked that the system 12 for searching for the optimum screwing position has been reset to zero.

The phase of approach and locking of the stud on the screwing apparatus then follows.

For this purpose the programmable automaton 40 controls the lowering of the rod 14 of the jack 13, which drives the shaft 18 and the spindle 21, in order to bring the shaft 18 towards the stud 3 and to engage the rotational driving splines 20. Through the action of the automaton, the small jack 23 locks the gripping system 22 on the stud 3, the position of the locking means being verified, for example, by proximity contact.

The automaton 40 then controls the loading of the jack 13, with verification of the initial load, i.e., the weight Po of the equipped stud, and with the aid of the pilot operated jack 13 controls the lowering of the stud 3.

The value of the pressures in the chambers 16 and 17 of the jack 13 is measured and transmitted by the sensors a and b or the differential pressure sensor e. The difference in pressure between the two chambers 16 and 17 is thus measured and converted into an electric signal transmitted by the sensors a and b or the sensor e, and compared with a desired value signal X corresponding to the value of the weight which it is desired to balance.

The programmable automaton 40 therefore makes the comparison of the set value X signal and the signal kp given by the sensors a and b or the sensor e. If these two signals are different, this programmable automaton produces the difference: $\Sigma = X - kp$ and amplifies this error signal $\Sigma$ to operate and feed the jack 13 to bring the pressure in the chambers 16 and 17 to values such that the difference in pressure between these two chambers corresponds to a residual force equal to the weight of the stud 3 which it is desired to balance. In accordance with the sign of the error signal $\Sigma$, the coil 34 of the solenoid valve 33 is fed to allow the opening of said valve in the desired direction and consequently the feeding of the desired chamber of the jack 13.

In order to ensure that the weight Po is not borne by the first thread of the threaded hole, as soon as contact is made between the stud 3 and the counterbore of the receiving threaded hole in the vessel the weight of the stud is balanced by the jack 13, for example to the extent of 90%.

The apparatus is now ready to start the screwing-in phase.

The automaton 40 controls the starting of the variable speed motor 24 for rotation in the opposite direction over a maximum of one revolution in order to engage the screw threads of the stud 3 in the receiving threaded hole. The encoder measuring the displacement of the small pinion 29 on the rack 30 then detects a negative displacement, and when the stud descends to the extent of one turn of the screw thread, discrimination of the change of sign of the displacement takes place, so that rotation in the opposite direction stops.

During this phase, the balancing of the weight of the stud 3 by the jack 3 remains operational in order to avoid a shock on the first thread of the threaded hole. By means of the variable speed motor 24, the reduction gearbox 25 driving the gear 27, the pinion 28 and the splined shaft 18, the automaton 40 then controls the commencement of the screwing-in over two to three turns, if possible, at low speed.

If in the course of the screwing-in the torque increases without any slippage of the variable speed motor 24, the latter is compared with an engagement threshold for the operation of the system of tables 12a and 12b, in order to obtain a search trajectory for the optimum screwing-in position, while screwing-in is continued. This engagement torque is therefore adjusted to a value slightly lower than the slipping torque.

In order to stop the tables 12a and 12b, the disengagement torque for the movement of said tables is set to a value slightly below the engagement torque.

As soon as the screwing-in torque falls back below the disengagement torque, the variable speed motor stops slipping, so that the stud starts to turn again.

Screwing-in is thus continued for two to three turns at low speed, whereupon a change is made to high speed with balancing of the weight of the jack to the extent of, for example, 95%.

If jamming occurs again, the automaton 40 will order a new search for the optimum screwing-in position by the system 12. When the jamming has been eliminated, screwing-in continues at high speed until jamming recurs, and so on.

The end of the screwing-in is detected by the travel of the weight balancing jack 13, i.e., by the displacement of the small pinion 29 on the rack 30, in correlation with the displacement of the desired value of the torque through the slippage of the variable speed motor 24.

As soon as the end of the screwing-in is detected, the automaton 40 controls, by means of the small jack 23, the unlocking of the spindle 21 from the stud 3 and the raising of the weight balancing jack 13 driving the splined shaft 18 and the spindle 21.

A stud is unscrewed by carrying out the same operations of the preparatory phase, i.e., positioning the screwing and unscrewing apparatus 10 above the stud 3 which is to be unscrewed, checking the verticality of the apparatus, and making the different electrical and hydraulic connections.

The phase of bringing the drive shaft 18 towards the stud and locking the spindle 21 on the stud proceeds in the same way as for screwing-in, but the weight balancing by the jack 13 is set negatively at 105% of the weight of the stud, with traction in the upward direction, thus making contact between the top part of the screw thread of the stud and the receiving threaded hole.

The automaton 40 then controls the unscrewing of the stud by means of the splined shaft 18 driven by the variable speed motor 24, and unscrewing is stopped when the bottom end of the stud is disengaged from the counterbore at the top of the threaded hole to the extent of about one hundred millimeters.

Generally speaking, the speed of the screwing apparatus is regulable in steps of 5 to 50 revolutions per minute, and the weight balancing by the jack 13 is adjustable from 0 to 200% of the weight of the stud. in addition, screwing-in is started after verification of the verticality of the stud, the connection between the splined shaft and the stud and also the locking spindle permitting an angular deflection of 1° to 2°.

It can be seen that the advantages of the apparatus according to the invention are that it enables studs of large dimensions to be screwed into their receiving threaded holes under optimum conditions of contact, namely, minimum screwing torque, the pressure of the stud thread on the hole thread controlled in value within a close dispersion range, and a check on the coaxiality of the axes of the stud and the threaded hole. These conditions in conjunction prevent the formation of fine shavings through excessive friction between the stud and the threaded hole, and the seizing of the stud in the threaded hole, and correlatively shorten the time required for the screwing-in and unscrewing operations.

Finally, the apparatus according to the invention is applicable not only to nuclear power stations incorporating a pressurized water reactor, but also to other sectors of the nuclear industry, to petroleum and petrochemical installations, to mining installations, or also to the closing of turbines, hydraulic valves, pressure pipelines, or valve bodies. In a general way, the apparatus according to the invention can be applied in numerous industrial installations utilizing screw components of large dimensions.

We claim:

1. Apparatus for screwing in and out studs (3) of large dimensions for fastening a cover (1) of a vessel (2) provided with receiving threaded holes, said apparatus comprising (a) a system (12) searching for an optimum screwing-in position for said stud (3) and for orienting said stud in accordance with an appropriate trajectory;

(b) a system (13) for compensating the weight of said stud;

(c) means (18, 24, 25) for rotationally driving said stud (3) at an adjustable speed in clockwise and counterclockwise directions;

(d) gripping means (21, 22) for said stud (3) enabling an axial load to be applied to said stud; and (e) a programmable automaton (40) for pilot operation of said apparatus, wherein (f) said weight compensating system (13) is pilot operated by oleohydraulic means (14, 15, 16, 17) by electrohydraulic force feedback control based on accurate measurement of hydraulic pressure detected at said oleohydraulic means or of a balancing load to be applied by said oleohydraulic means in order to limit contact pressure of said stud in said threaded hole, and axially driving, over an adequate path, the assembly comprising said means (18) for rotationally driving the stud (3) and said stud gripping means (21, 22).

2. Apparatus according to claim 1, wherein said means for rotationally driving said stud (3) at an adjustable speed is controlled by a variable speed eddy current motor (24) allowing slippage and stoppage of rotational driving of said stud (3) above a predetermined screwing torque threshold.

3. Apparatus according to claim 1, wherein said optimum screwing position search system (12) acts on a casing (11) which forms a body of said oleohydraulic means (14, 15, 16, 17) of said weight compensating system and which, together with said oleohydraulic means, said drive means and said gripping means constitutes means for orienting said stud on an appropriate trajectory.

4. Apparatus according to claim 1, wherein said oleohydraulic means of said weight compensating system comprises a jack (13) having a hollow rod (14) which moves in said casing (11) and which is provided on its periphery with a piston (15) forming two chambers (16, 17) in said casing.

5. Apparatus according to claim 4, wherein displacements of said rod (14) of said jack (13) are under feedback control of a difference in pressure between said chambers (16, 17) and detected by differential sensors (A, B) disposed in each of said chambers or by a single differential pressure sensor (e).

6. Apparatus according to claim 1, wherein said means for rotationally driving said stud consists of a hollow shaft (18) incorporated in said rod (14), moving axially simultaneously with said rod, and rotationally driven by a variable speed motor (24) with the aid of a reduction gearbox (25) and a gear (27) meshing with a pinion (28) fastened to said hollow shaft.

7. Apparatus according to claim 1, wherein said gripping means consists of a spindle (21) incorporated in the shaft (18) of said means for rotationally driving said stud and moving axially at the same time as said shaft (18) and said rod (14) of said jack (13).

* * * * *

UNITED STATES PATENT AND TRADEMARK OFFICE
CERTIFICATE OF CORRECTION

PATENT NO. : 5,101,694
DATED : April 7, 1992
INVENTOR(S) : Gerard SEVELINGE, Jean-Claude BOURDONNE It is certified that error appears in the above-indentified patent and that said Letters Patent is hereby corrected as shown below:

On the title page, Item [75]: the second inventor's name has been misspelled. The inventor's name should be: —Jean-Claude BOURDONNE—.

Signed and Sealed this

Twenty-fifth Day of January, 1994

Attest:

BRUCE LEHMAN

*Attesting Officer*  *Commissioner of Patents and Trademarks*